Jan. 17, 1939. C. EVANS, JR 2,144,048
CONVEYER
Filed Sept. 27, 1937
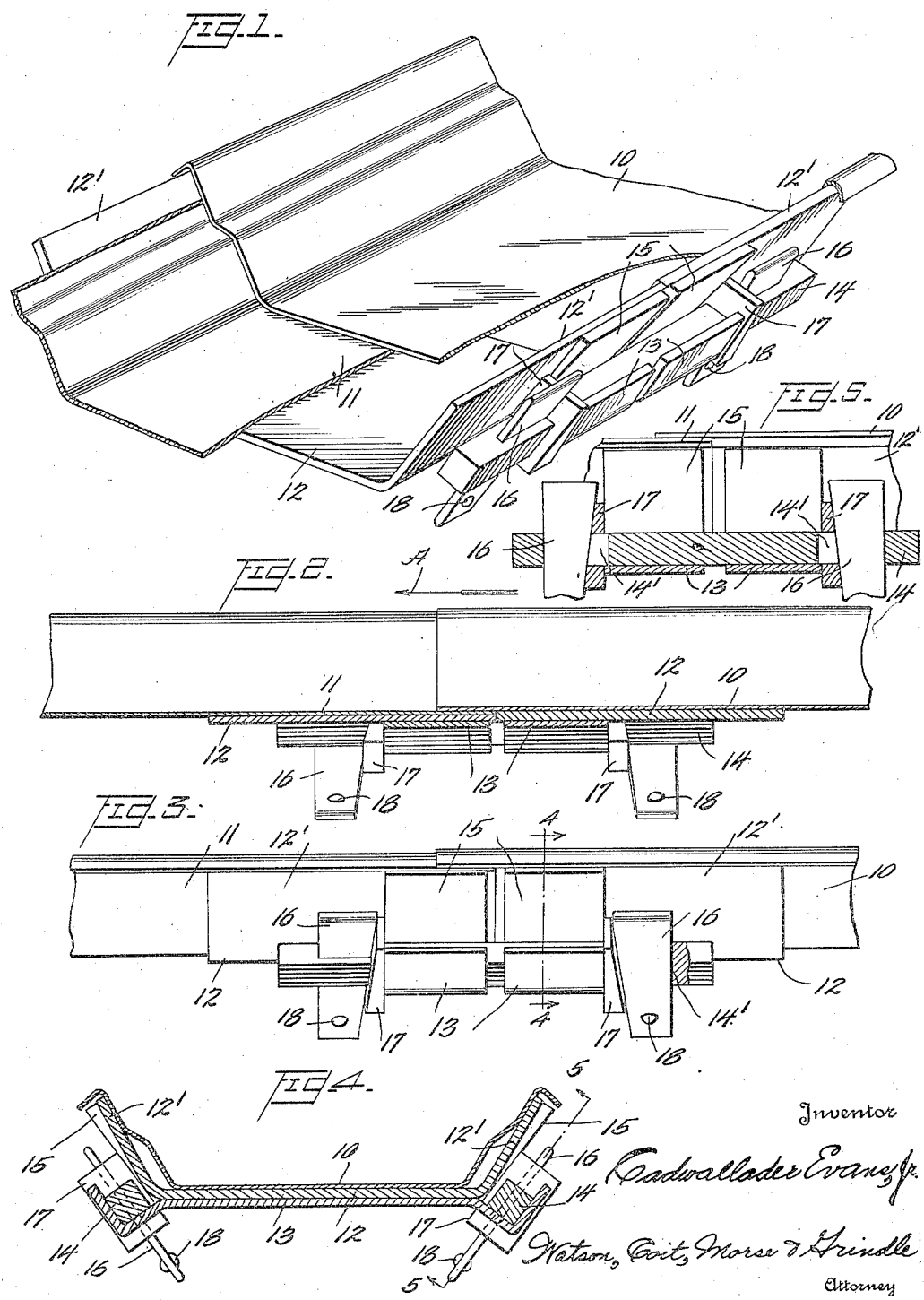

Patented Jan. 17, 1939

2,144,048

UNITED STATES PATENT OFFICE 2,144,048

CONVEYER

Cadwallader Evans, Jr., Scranton, Pa.

Application September 27, 1937, Serial No. 165,992

7 Claims. (Cl. 198—220)

This invention relates to conveyers and particularly to means for connecting the adjacent ends of the pans of conveyers of the elongated reciprocating trough type, sometimes called jigging conveyers.

Conveyers of this type have long been known and used for the transportation along substantially straight line paths of granular material such for instance as coal, iron ore, and grain. Essentially the conveyer comprises a plurality of aligned elongated trough-like members or pans, the ends of each pan being connected by suitable means to the ends of adjacent pans, the entire conveyer comprising oftentimes a very considerable number of such pans and being supported in such manner that it may be reciprocated longitudinally, and sometimes given a rising and falling movement as well. The means for producing longitudinal reciprocatory movements of the conveyer comprises a power device or engine generally positioned at one end of the conveyer and the impulses from this conveyer actuating means are transmitted from one end of the conveyer to the other through the conveyer structure itself.

Obviously the securing devices employed for interconnecting adjacent ends of the conveyer pans are subjected to heavy strains, especially where the conveyer comprises a large number of pans and is of great length. While various types of securing devices have heretofore been designed or suggested for interconnecting the adjacent ends of the pan sections of such conveyer, in actual practice only ordinary bolts are commonly made use of, the more complicated securing means heretofore proposed not having been adopted, for one reason or another. The adjacent ends of two pans may be connected together by means of bolts very readily and the initial cost of such securing means is comparatively slight. In actual use, however, the securing bolts tend to work loose and to eventually permit play between adjacent conveyer pans during the operation of the conveyer, or to fail completely and to cause a break in the conveyer. Even a small amount of play or lost motion in a jigging conveyer is highly injurious to the operation of the conveyer and, inasmuch as these conveyers are now constructed to have lengths of five or six hundred feet when used in coal mines, thus embodying a large number of pans or troughs and pan connecting means, it is obviously desirable to provide some form of pan connecting means which will maintain adjacent pans in fixed relationship at all times, permitting no play or lost motion at any time, and not being subject to failure even after long continued use.

It is the purpose of the present invention to provide a conveyer having pan or trough interconnecting means of novel type capable of maintaining the adjacent ends of adjacent pans in constant fixed relationship at all times during the life of the conveyer. The customary securing bolts are dispensed with and in lieu thereof tension members are provided which constantly maintain in abutting relationship two abutment members, one on each pan, wedging devices being associated with each tension member for taking up any wear which may occur. When the pan connecting means which comprises the subject matter of the present invention is made use of, pans of light gauge metal may be employed which may also have any desired length and cross-section, the pan connecting means being readily attachable to the ends of pans of different types, for instance by welding. The initial cost of the construction is therefore minimized.

One form of the invention is illustrated in the accompanying drawing, in which:

Figure 1 is a perspective view, partially broken away, of the overlapping ends of two adjacent conveyer pans, together with the novel means for connecting these pans;

Figure 2 is a vertical longitudinal section through the conveyer pans and connecting means;

Figure 3 is a side elevation of the same;

Figure 4 is a section on line 4—4 of Figure 3; and

Figure 5 is a section on line 5—5 of Figure 4.

The adjacent overlapping ends of two aligned adjacent pans are indicated at 10 and 11 respectively, the pan 10 overlying the pan 11, as shown in Figure 2, so that bulk material may pass uninterruptedly along the conveyer in the direction of the arrow A shown in Figure 2. The pans are of relatively light gauge sheet metal and preferably are formed in cross-section, as shown in the drawing, particularly in Figure 4, although the precise configuration of the pans in cross-section is immaterial.

Rigidly secured to the undersurface of each pan is a member 12, preferably of pressed steel, and substantially thicker than the pan itself, each such member having a central horizontal portion which lies flush against the undersurface of the pan to which it is affixed, and having upwardly and outwardly inclined end portions 12' which underlie the upwardly and outwardly inclined side walls of the pan. The members 12 are preferably united to the respective pans by welding and, as will be perceived from an inspection of Figure 2, the right-hand member 12 is somewhat thicker than the left-hand member in order that the lower surfaces of these members may be substantially in the same plane while at the same time the mutually facing horizontal surfaces of the overlapping portions of the conveyer pans may be in contact.

The adjacent edges of members 12 are in contact, as shown in Figure 2, at all times, and the longitudinal thrust of the conveyer actuating mechanism is communicated from one pan to the other by means of members 12, which will hereinafter be designated abutment members. It is only necessary to provide means for maintaining the abutment members 12 in constant abutting relationship.

Secured to the undersurfaces of the abutment members 12, respectively, are pressed steel abutment elements 13 which extend transversely of the conveyer, as most clearly shown in Figure 4, and the ends of which are shaped as shown so as to comprise retaining brackets, respectively, for tension members 14. Members 13 are preferably welded to member 12 but the adjacent laterally extending edges of these members are spaced apart, as shown in Figures 2 and 3, and at no time contact with each other. Rectangular plates 15, wedge shaped in vertical cross-section, and tapering downwardly, are welded to the flanges 12' of members 12 respectively, these members having their adjacent vertical edges spaced apart. These members cooperate with abutment elements 13 in the retention of the tension members 14, and also comprise abutments for the wedging devices hereinafter to be described, which devices are carried by the tension members.

Each tension member has formed therein spaced slots 14', through each of which extends a downwardly tapering wedge member 16, the outer vertical edge of which slidably engages the outer end of the slot within which it is located and the inclined inner edge of which engages the adjacent inclined surface of a wedging member 17 which is formed substantially as a rectangular washer, being centrally apertured to receive the tension member 14. The inner face of each wedging member 17 engages the outer edge surface of the bracket-like projecting end portions of the adjacent member 13, and also the outer edge surface of the adjacent wedge-like element 15, so that it is firmly supported against inward movement. Each wedge is provided with an enlargement 18, preferably the head of a rivet which is passed through the small end of the wedge, to prevent removal of the wedge from the tension member, and loss of the same, when the parts are disassembled.

When the tension members 14 are mounted upon their retaining brackets, comprising the end extensions of abutment elements 13, and the wedge devices are positioned as shown, with wedges 16 driven lightly into position, the abutment members 12 are drawn into tight engagement with each other so as to transmit the longitudinal thrust of one conveyer pan to the other conveyer pan. When the motion of the conveyer is reversed and one pan tends to pull away from the other, the tension members 14 are placed under stress but the abutting surfaces of abutting members 12 nevertheless remain in close engagement with each other. The connecting means can transmit heavy forces from one pan of the conveyer to the other in either direction and there is no possibility that, due to wear of any of the connecting parts, any play between the two pan sections will occur. Any possible play due to wear of the abutting faces of the two abutment members 12 may be readily taken up by manual adjustment of the wedge devices if such adjustment does not take place automatically. Notwithstanding the secure manner in which the adjacent ends of adjacent pans of the conveyer are attached, they may be readily disassembled by simply lifting one or other of the wedges 16 on each side of the conveyer and lifting the tension members 14 from their supporting brackets. In a relatively short time a lengthy conveyer can be disassembled, transported to a new position, and reassembled.

Having thus described the invention, what is claimed as new and desired to be secured by Letters Patent is:

1. Apparatus for conveying loose material comprising two aligned elongated conveyer pans, abutment members disposed transversely to and rigid with the adjacent ends of said pans respectively and normally in contact with each other, an abutment element rigid with and projecting laterally from each such member, said elements being spaced apart when said members are in contact, a tension rod disposed in generally paralell relationship to the aligned pans, spaced wedging devices carried by the said rod, one such device engaging each abutment element, actuation of which tensions said rod and urges the abutment members into tight engagement.

2. The combination set forth in claim 1 in which the said abutment elements are designed and constructed to comprise means for supporting the tension rod.

3. The combination set forth in claim 1 in which the abutment elements likewise comprise brackets projecting laterally from the pans, respectively, upon which the tie rod rests and is detachably supported.

4. Apparatus for conveying loose material comprising two aligned elongated conveyer pans, abutment members rigid with the adjacent ends of said pans respectively and normally in contact with each other, an abutment element rigid with each such member, said elements being spaced apart when said members are in contact, a tension rod disposed in generally parallel relationship to the aligned pans, and wedging means carried by said rod for acting upon said abutment elements whereby said elements may be urged toward each other and the abutment members maintained in abutting relationship, said wedging means including a wedge slidably retained within an aperture extending transversely to said rod, and a member encircling the rod and interposed between the wedge and adjacent abutment element.

5. The combination set forth in claim 4 in which said last mentioned member is wedge-shaped in section taken longitudinally of the tension rod.

6. Apparatus for conveying loose material comprising two aligned elongated conveyer pans, two flat metal plates one of which is welded to the bottom of each pan, said plates comprising abutment members and being normally in mutual contact, an abutment element rigid with each member, said elements being spaced apart when said members are in contact, a tension member carried by said elements and disposed in generally parallel relationship to the aligned pans, and wedging means interposed between and operatively engaging the tension member and an abutment element whereby said elements may be urged toward each other to tension said tension member and maintain said abutment members in close contact.

7. The combination set forth in claim 6 in which the abutment elements comprise laterally extending portions of members rigidly attached to the undersurfaces of the abutment members, respectively.

CADWALLADER EVANS, JR.